United States Patent

Gil

[15] 3,702,905

[45] Nov. 14, 1972

[54] MULTI-STATION SHARED AUTOMATIC DIALING APPARATUS

[72] Inventor: Ramon Gil, Montville Twp., Morris City, N.J.

[73] Assignee: G-V Controls Inc., Livingston Township, Essex County, N.J.

[22] Filed: Nov. 19, 1970

[21] Appl. No.: 91,206

Related U.S. Application Data

[63] Continuation of Ser. No. 746,104, July 19, 1968.

[52] U.S. Cl. ..........................179/90 BD, 179/18 BA

[51] Int. Cl. ..............................................H04m 1/45

[58] Field of Search .179/90 B, 90 BB, 90 BD, 18 BA

[56] References Cited

UNITED STATES PATENTS

| | | | |
|---|---|---|---|
| 3,341,666 | 9/1967 | Wallace | 179/90 BD |
| 3,441,685 | 4/1969 | Wallace | 179/90 B |
| 3,325,602 | 6/1967 | Truby | 179/18 BA |
| 2,951,908 | 9/1960 | Malthaner | 179/18 BA |

*Primary Examiner*—Kathleen H. Claffy
*Assistant Examiner*—Thomas D'Amico
*Attorney*—Charles T. Jacobs

[57] ABSTRACT

The use of an automatic dial-signal generating means is shared by a plurality of stations each having its own telephone line. Each station has a plurality of selective controls each operable to select a respective one of a number of programming devices common to all the stations, and means which mark that station in response to a selection-control operation thereat. Appropriate means preclude a more-than-transient coexistent marking of any plurality of the stations, and there is associated with each station a respective means responsive to a selection-control operation at that station for supplying activating current therefrom to the selected programming device only after that station has remained marked for a brief but more-than-transient period.

9 Claims, 2 Drawing Figures

PATENTED NOV 14 1972 3,702,905

SHEET 1 OF 2

Figure 1:
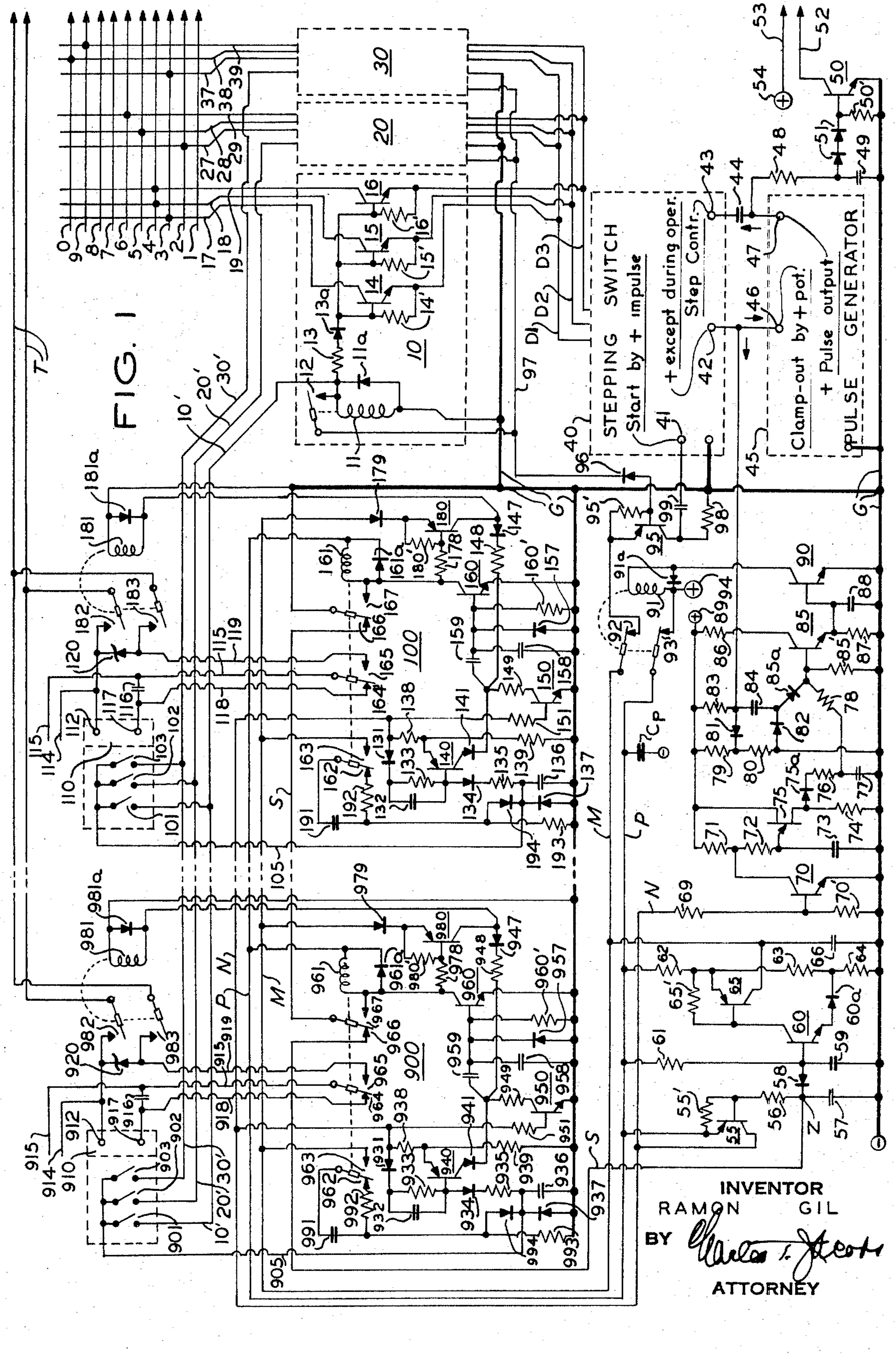

INVENTOR
RAMON GIL
BY [signature]
ATTORNEY

INVENTOR
RAMON GIL
BY Charles I. Jacobs
ATTORNEY

MULTI-STATION SHARED AUTOMATIC DIALING APPARATUS

This application is a continuation of application Ser. No. 746,104 filed July 19, 1968.

This invention relates to Automatic Dialing Apparatus, and more particularly to a system in which an automatic dial-signal generating means may be shared by a plurality of stations each having its own telephone line.

Such systems as heretofore known have suffered from various deficiencies in the service which they have provided to the users at the several stations. Broad objects of the present invention are to cure such deficiencies, and to provide a generally improved system of the type above referred to.

Among more particular objects are to provide a system wherein, even though it already be in use by the user at one station, another user or other users may nevertheless place on it a demand or demands which will be filled at the earliest possible moment or moments; to provide an order of priority for the settlement of any inter-station "race" conditions; and to limit the effect of that order of priority so that it does not result in undue or unnecessary preferences.

Another object is to arrange the sequence of actions occurring in the initiation of dialing of a telephone address in a manner itself particularly favorable, and moreover best adapting the system to the achievement of such objects as have been set forth in the preceding paragraph. Still another object is to insure that despite the favorable sequence just mentioned there will be no spurious signals transmitted out on the telephone line. Another object is to safeguard the system against maloperation. Allied and other objects will hereinafter more fully appear.

According to the invention in its simpler aspects, there are associated with a dial-signal generating means a plurality of common programming devices by the supply of activating current to any of which the generating means is programmed for a respective telephone address. A plurality of stations are provided, each having (i) a respective telephone line, (ii) a plurality of selection controls each operable to select a respective one of the programming devices, and (iii) means normally effective to mark that station in response to a selection-control operation thereat; means are connected with the stations for precluding a more-than-transient coexistent marking of any plurality thereof; and with each station there is associated a respective means, responsive to a selection-control operation at that station, for supplying activating current from that station to the programming deveice selected at that station, only after that station has remained marked for a brief but more-than-transient period.

There may be provided means effective upon the supply of activating current to the selected programming device to place the generating means in operation on the line of the marked station, and means may be rendered effective upon the conclusion of such operation to de-mark the marked station. For each station there may be provided a respective means rendered effective as an incident to the placing of the generating means in operation on the telephone line of that station for precluding a re-marking of that station until the expiration of an apprecoable interval after the conclusion of such operation.

The marking means of each station may comprise a respective station relay and a holding means therefor, and the means for precluding a more-than-transient coexistent marking of any plurality of the stations may include circuit means connected with the several such holding means. Such circuit means may comprise a series circuit interconnecting the stations in a predetermined order of priority and effective while any one of the stations (other than the one of lowest priority) remains marked for incapacitating the holding means of all of the stations lower in priority than that one station.

In the detailed description of the invention hereinafter set forth reference is made to the accompanying drawings, in which FIGS. 1 and 2 taken together show a typical embodiment of the invention.

Figure 2:
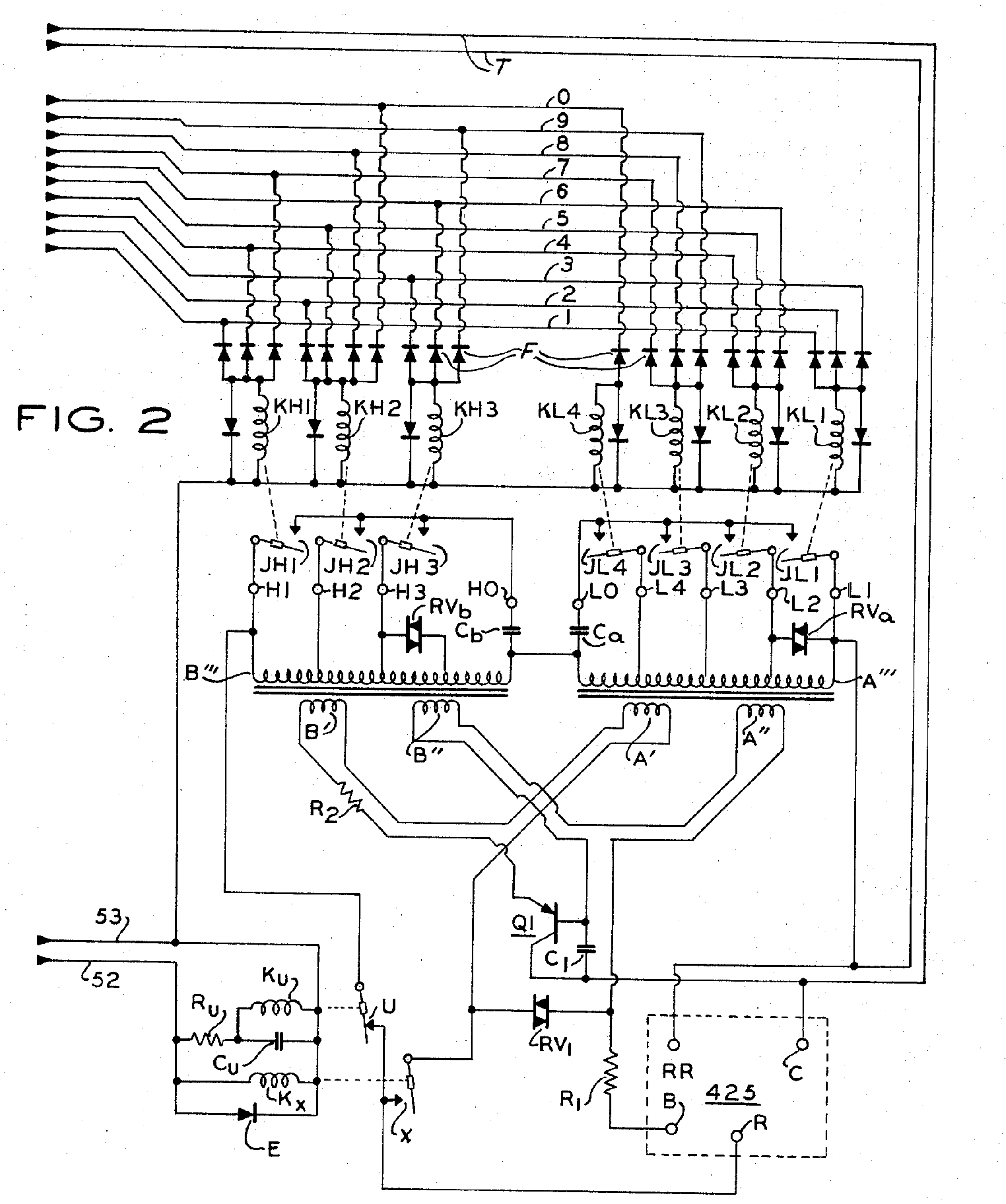

The apparatus illustrated in the righthand portion of FIG. 1 and in FIG. 2 may be first described. An address circuit 10 is shown, programmable for the dialing of a three-digit number. The illustrated circuit comprises an address relay 11 (whose coil is shunted by a protective diode 11*a*) having normally open contacts 12. The coil of this address relay is connected between an address conductor 10', individual to the address circuit 10 and hereinafter more fully referred to, and the "ground" (or power-supply negative) conductor G. The conductor 10' may also be connected through a resistor 13 and diode 13*a* to the bases of three n-p-n transistors 14, 15 and 16 (one for each digit); the base-emitter paths of these transistors may be shunted by respective resistors 14', 15' and 16'. One of the normally open contacts 12 may be connected to the address conductor 10', and the other to a conductor 97 (which if more than one address circuit be employed may be common to all) hereinafter more fully referred to. The emitters of the transistors 14, 15 and 16 may be connected to respective conductors D1, D2 and D3 (each of which if more than one address circuit be employed may be common to all).

If while a positive potential (with respect to ground) is applied to the address conductor 10' from a source to the left in FIG. 1 a positive potential also be applied to conductor 97, the address relay 11 will be shifted to operated conditions wherein its contacts 12 are closed; thereafter so long as conductor 97 remains positive conductor 10' will be maintained positive and the address relay 11 thus operated, independently of any cessation of positive-potential application to conductor 10' from the leftward source. Also so long as conductor 97 remains positive a positive potential will be applied through resistor 13 and diode 13*a* to the bases of the transistors 14, 15 and 16, so that any of those transistors whose emitter meanwhile becomes effectively grounded will then be rendered conductive and its collector will thereby be effectively grounded. In a dialing operation the digit conductors D1, D2 and D3 (to which those emitters are respectively connected) will be sequentially effectively grounded for example for about 100 milliseconds each thereby, under the conditions dealt with in this paragraph, to sequentially effectively ground the collectors of those transistors.

To provide for the selective dialing of a number of telephone addresses, the address circuit 10 may be duplicated by any number of additional address circuits; two such additional address circuits have been shown in FIG. 1 as 20 and 30 respectively, each having a respective address conductor 20' or 30' but having its three transistor emitters respectively connected to the same digit conductors D1, D2 and D3 as already described. The transistors in any one of those additional address circuits will be sequentially rendered conductive and their collectors sequentially grounded in the same manner as but instead of 14, 15 and 16, if the respective address conductor (20' or 30' ) be treated in the same manner as but instead of 10'.

The apparatus which sequentially effectively grounds D1, D2 and D3, and thus the transistor collectors of a selected address circuit, may typically be set into operation upon the application (above referred to) of a positive potential to the conductor 97. That apparatus itself may comprise a stepping switch, preferably electronic, shown schematically as 40 and a pulse generator, also preferably electronic, shown schematically as 45.

The stepping switch 40 may be one (a) having a number of steps equal to the number of digit conductors (e.g. in the illustrated case, three), (b) having a terminal 41 to which the application of a positive impulse will start the stepping switch, (c) having a terminal 42 maintained by the stepping switch at a positive potential excepting while the stepping switch is in operation, (d) having a terminal 43 to which after the stepping switch is in operation the application of a positive impulse will advance, the stepping switch, and (e) arranged to go out of operation when it has advanced once through all its steps. The pulse generator 45 may for example be one (i) having a cycle time of about 100 milliseconds, during which it generates a positive output pulse of about 50 milliseconds duration followed by an interval of about 50 milliseconds, (ii) having a terminal 46 to which the application of a positive potential will clamp the pulse generator out of operation, and (iii) having a terminal 47 at which its output pulses are developed. The connection of the start terminal 41 is hereinafter described; the terminals 46 and 42 may be connected together so that only while the stepping switch is in operation will the pulse generator function; and terminal 47 may be connected to the terminal 43 through a capacitor 44 so as to advance the stepping switch at the onset of each output pulse from the pulse generator (other than the first of any series, which may be caused not to prematurely advance the stepping switch by known means included in the latter). The stepping switch and pulse generator taken collectively may for example be similar to the pulse generator and stepping switch, taken with certain circuitry illustrated therebetween, detailedly disclosed in U.S. Pat. No. 3,417,207 issued on application of Walter Pecota and illustrated in FIG. 1 of that patent.

Before describing the results of the sequential effective grounding of the address-circuit transistor collectors attention may be turned to the essentially conventional dual-frequency tone-dialing audio oscillator embodied in the illustrated apparatus in FIG. 2 (lower portion). There a conventional telephone network 425 is shown, in which by proper connection of its terminals C and RR to the telephone line C is rendered negative and RR positive (B and R assuming intermediate potentials). A p-n-p transistor Q1, whose collector is connected to the terminal C, is the amplifying element of the oscillator. The requisite feedback is provided by two ferrite-core transformers whose primaries B' and A', together with a resistor $R_2$ and a pair of normally open contacts X, are serially connected between the emitter of $Q_1$ and the terminal R, and whose secondaries B'' and A'' and a resistor $R_1$ are serially connected between the base of $Q_1$ and the terminal B. A capacitor $C_1$ is connected between the base and the collector of $Q_1$, and a varistor $RV_1$ is connected between the primary and secondary returns (not embracing either X or $R_1$). The transformers are provided with respective tertiaries A''' and B''', each provided with three taps; the outer extremity of A''' is connected to the terminal RR, the outer extremity of B''' is connected to the terminal R through a pair of normally closed contacts U, and the inner extremities of A''' and B''' are connected together. Respective varistors $RV_a$ and $RV_b$ shunted across appropriate portions of the tertiaries provide amplitude limitation for the low- and high-frequency tone components of the oscillation. Tuning of the oscillator is effected in the circuits of the tertiaries, as more fully referred to below.

The actual and proper operation of the oscillator requires not only its tuning but also, after that tuning has been effected, the closure of the contacts X and, minutely thereafter, the opening of the contacts U. As will hereafter appear, a respective tuning is effected at the onset of each output pulse from the pulse generator 45. From that generator's output terminal 47 there may be connected to ground a time-delay circuit serially comprising a resistor 48 and a capacitor 49, the slightly delayed voltage from across that capacitor being applied, through one or more dropping diodes, across the base-emitter path (which is shunted by resistor 50') of an n-p-n transistor 50. Between the collector of that transistor and a terminal 54 of substantial positive potential there may be connected the coil of a relay $K_x$ and, in parallel therewith, a series circuit comprising (i) a resistor $R_u$ and (ii) a capacitor $C_u$ and the coil of a relay $K_u$ in parallel with each other (a protective diode E shunting all those elements collectively). The contacts X are comprised in relay $K_x$, and the contacts U are comprised in relay $K_u$. A millisecond or so after the onset of a pulse transistor 50 will be rendered conductive and relay $K_x$ operated to close contacts X; minutely thereafter (in view of $R_u$ and $C_u$ ) relay $K_u$ will be operated to open contacts U, and the oscillator will be placed in operation. Those two sets of contacts will be returned to their normal conditions upon the resumed non-conductivity of transistor 50 occurring about 50 milliseconds later, following which the oscillator will be out of operation (if the stepping switch and pulse generator still be operating, then only until just after the onset of the next pulse).

Tuning of the two frequency components of the oscillator may be achieved by the selective connections of respective capacitors $C_a$ and $C_b$, a first terminal of each of which is fixedly connected to the A'''–B''' junction, across the entireties or selected portions of A''' and B'''. For this purpose the second terminals of those capacitors may be brought to respective terminals LO and HO, the outer extremity and taps of A''' may be brought to respective terminals L1, L2, L3 and L4, and the outer extremity and two of the taps of B''' may be brought to respective terminals H1, H2 and H3;

then tuning will be effected by closing a selected one of four sets of normally open contacts JL1 through JL4 each of which is connected between terminal LO and a respective one of terminals L1 through L4, and closing a selected one of three sets of normally open contacts JH1 through JH3 each of which is connected between terminal HO and a respective one of terminals H1 through H3. JL1 through JL4 may form the contacts of respective relays KL1 through KL4, and JH1 through JH3 may form the contacts of respective relays KH1 through KH3; the lower extremity of the coil of each of these relays (each of which is shunted by an unnumbered protective diode) may be connected to the positive terminal 54, and it will accordingly be understood that the selective effective groundings of the upper extremities of one of the "KL" relays and of one of the "KH" relays will energize those relays, closing the contacts thereof and thereby effecting tuning of the oscillator.

In the upper portion of FIG. 2 there appear 10 horizontally shown busses which are respectively designated as 1 through 9 and 0, and which represent those integers in a telephone address. To those busses the upper extremities of the coils of relays KL1 through KL4 and KH1 through KH3 may be connected through respective isolating diodes F —following a telephone code which, being conventional, need not itself be detailed here. Each of those busses being connected (as shown) through respective diodes to an appropriate two of the relay coils, it becomes obvious that the selective effective grounding of any one of those busses will accomplish a selected dual-frequency tuning of the oscillator. It follows that a sequence of horizontal-bus groundings will effect a sequence of such tunings — and it is this which is accomplished by the already-described sequential effective groundings of the transistor collectors of the address circuit 10 (or of any of the additional address circuits 20 and 30), through the intermediary of such an arrangement as that described in the next paragraph.

In that arrangement the transistor collectors of address circuit 10 may be connected to vertical busses 17, 19 and 19 respectively (and those collectors of address circuit 20 to vertical busses 27, 28 and 29 respectively, and those of 30 to vertical busses 37, 38 and 39 respectively) — each group of those vertical busses, though for clarity shown outside the dotted enclosure of the respective address circuit, being conveniently considered as forming parts of that address circuit. The horizontal busses 1 through 9 and 0 may be extended to be overlain by (or to overlie) all the vertical busses, and the resulting "cross-bar" arrangement will provide for the connection, which is desired, of each vertical bus to a selected single one of the horizontal busses. The heavy dots in the upper righthand corner of FIG. 1 arbitrarily indicate the connections of 17 to 3, and of each of 18 and 19 to 4; these connections program the address circuit 10 for the telephone address "344" (other heavy dots indicating connections of 27, 28 and 29 to program address circuit 20 for the telephone address "256," and connections of 37, 38 and 39 to program address circuit 30 for the telephone address "309").

The typical action of the apparatus as thus far described may be briefly reviewed, in terms of address circuit 10, as follows: If, while a positive potential is applied (from the above-postulated leftward source) to address conductor 10', a positive potential also be applied to conductor 97, the address relay 11 will be shifted from its unoperated or normal condition to its operated condition, which will be maintained (no longer in reliance on that postulated source) by its contacts 12. As an incident to the application of positive potential to the conductor 97 the stepping switch and pulse generator will be started. At their start (which constitutes the onset of the first pulse) the upper extremities of the relays (KL1 and KH3) connected to the bus 3 will be effectively grounded through the respectively associated diode F, the busses 3 and 17, the now-conductive transistor 14, the conductor D1 and the stepping switch, and there will be accomplished a tuning of the oscillator appropriate to the integer "3;" a millisecond or so later the oscillator will begin an actual operation of about 50 milliseconds during which it will generate the dual-frequency output representing that integer (that output appearing across the network terminals RR and C) and after which it will cease operating. About 100 milliseconds after the onset of the first pulse there will occur the onset of the second pulse and the action described in the preceding sentence will be repeated, excepting that the now-involved integer will be "4" and the now-involved elements will be relays KL2 and KH1, busses 4 and 18, transistor 15, conductor D2 and the stepping switch — and about still another 100 milliseconds later the action will again be repeated, with the now-involved integer again being "4" and the relays again being KL2 and KH1 but with the other now-involved elements being busses 4 and 19, transistor 16, conductor D3 and the stepping switch. After yet another approximate 100 milliseconds the stepping switch will go out of operation.

The apparatus as thus far described, and its use in connection with an individual station and its associated telephone line, are known. It is when it is sought to share a single such apparatus between a number of telephone stations, each of which will typically have its own associated telephone line, that there are encountered various problems, some of them introductorily mentioned above, to the solution of which my invention is primarily directed. That invention, which is comprised principally in the apparatus shown in the central and lefthand portions of FIG. 1 but which necessarily involves various interrelationships to the abovementioned known apparatus, may now be described. For simplicity of description it has been illustrated as applied to only two sharing stations 100 and 900, but any number of other sharing stations up to seven may be interposed therebetween and any additional number beyond nine added.

A first station 100 is shown in the central upper portion of FIG. 1. Herein the station proper — typically the usual telephone desk or wall set in its entirety, complete with handset — is schematically illustrated as 110. The associated telephone line appears in the form of conductors 114 (normally positive) and 115 (normally negative), one of the conductors, 114 for example, being connected as usual to the appropriate station terminal 112. The other conductor, 115 for example, which would normally be directly connected to the other station terminal 117, may instead be connected to that terminal through a capacitor 116, and from that terminal 117 there may lead a conductor 118; the conductors 115 and 118 may be connected across normally closed contacts 164 comprised in a station relay 161 hereinafter further mentioned, so that normally the capacitor 116 is shorted and a wholly normal connection of station to line exists. During the act of dialing by the illustrated apparatus, however, the contacts 164 are opened and, by another pair of station-relay contacts 165 which are then closed, the conductor 115 is connected with a conductor 119; the conductors 114 and 119 (and through the latter, 115) are then connected, through respective contact pairs 182 and 183 which are then closed as hereinafter further dealt with, across a local line T, which leads to the FIG.-2 network terminals RR and C. Thus during that act of dialing the station's telephone line 114–115 is directly connected with those network terminals; the station 110 itself then has only that coupling to the line 114–115 which can occur through the capacitor 116, which is so chosen as to provide a desired degree of side-tone in the handset earphone but which of course incapacitates the handset transmitter by clocking d.c. current thereto.

As will hereinafter appear the opening of contacts 164 will precede, by an interval which may for example be of the order of 20 milliseconds, the closure of the contacts 182 and 183, and during this interval no d.c. load will be placed on the telephone line either by the station proper 110 or by the FIG.-2 network; the removal and subsequent restoration of such a load from and to the telephone line 114–115 may result in spurious line information being transmitted to the telephone exchange. To provide a d.c. load on the line 114–115 during that interval a Zener diode 120 may be shunted from the positive conductor 114 to the conductor 119, so that it will be promptly placed in circuit upon the opening of contacts 164 and closing of 165; the Zener voltage of this diode will be made reliably but not grossly higher than the maximum d.c. voltage which when the contacts 192 and 183 are closed will appear across the FIG.-2 network terminals RR and C Embodied in or located conveniently adjacent to the station proper 110 there may be provided an openly-biased push-button switch 101, with the lower of whose terminals there may be connected the address conductor 10′ leading to the address circuit 10 described above; if "access" of station 100 to other address circuits is also to be afforded there will also be similarly provided further similar push-button switches such as 102 and 103, with the lower terminals of which there will be respectively connected the appropriate address conductors such as 20′ and 30′. A common conductor 105 may lead from the upper terminals of the switches 101, 102 etc. to electronic apparatus provided for that station as hereinafter described.

The electronic apparatus provided for each station is in important degree controlled by certain common conductors P, N and M, and before detailing that individual-station electronic apparatus it is convenient first to describe certain electronic apparatus common to all stations by which those conductors are themselves controlled. This particular common electronic apparatus is illustrated in the lower lefthand portion of FIG. 1.

The conductor P enters this portion from the right; except for subjection to a short interruption (as hereinafter described) at the conclusion of a dialing operation, this conductor is connected with a terminal 94 (seen in the lower central portion of FIG. 1) of substantial positive potential, such for example as that of terminal 54 abovementioned. It may be by-passed to ground (here indicated by a hyphen enclosed in a circle) through a capacitor $C_p$ of substantial value.

The conductor N is normally supplied with positive potential, from the conductor P, through the emitter-collector path of a p-n-p transistor 55 (whose emitter-base path is shunted by a resistor 55′), the emitter being connected to P and the collector to N. The base of transistor 55 is connected through a resistor 56 to a point Z (which is by-passed to ground through a small capacitor 57); point Z is normally grounded through a series circuit S which passes serially through the several stations' electronic apparatuses and is hereinafter more fully dealt with — and so long as Z remains so grounded the transistor 55 is conductive and the conductor N is at substantially the potential of conductor P. Whenever the series circuit S is broken, however, the point Z ceases to be grounded, the transistor 55 ceases abruptly (e.g. in a fraction of a millisecond) to be conductive, and the potential of the conductor N falls to a negligible value — conditions which will persevere until the series circuit S is reclosed.

On the other hand the conductor M (which may be by-passed to ground through a small capacitor 66) is normally without any supply of positive potential. It is, however, connected to the collector of a p-n-p transistor 65 whose emitter is connected to a point of near-P positive potential — i.e. the junction of resistors 62 and 63 in a series chain 62–63–64 which extends from conductor P to ground — and will assume a near-P positive potential whenever the transistor 65 is conductive. The collector-emitter path of an n-p-n transistor 60, in series with a protective diode **60*a*, is shunted from the base of transistor 65 to the junction of resistors 63 and 64; its base is connected to the interelement junction of a time-delay circuit, serially comprising an upper resistor 61 and a lower capacitor 59, which in turn is connected from conductor P to ground — and that base is also clamped down to the point Z through a diode 58. The transistor 60, and therefore the transistor 65, is normally non-conductive — but whenever the series circuit S is broken and the point Z therefore ceases to be grounded the capacitor 59 will begin to charge, and after it has charged for approximately 20 milliseconds its voltage will have risen sufficiently to render the transistor 60, and therefore the transistor 65**, conductive. The potential of the conductor M will then rise to near-P potential, and will so remain until the series circuit S is reclosed. It should be noted that while the potential fall of N occurs essentially forthwith on the breaking of the series circuit S, the potential rise of M does not occur until about 20 milliseconds thereafter.

Attention may now be redirected to the electronic apparatus provided for the individual station 100. This apparatus may include a pair of voltage-dividing resistors 138 and 139 connected between conductor N and ground. To the junction between those resistors there may be connected the emitter of a p-n-p transistor 140. From conductor N (which as abovementioned is normally at substantial positive potential) to the base of transistor 140 there may be connected a circuit serially comprising a diode 131 and a resistor 133, the latter being shunted by a time-delay capacitor 132. The base of transistor 140 may be connected to the conductor 105 (abovementioned as leading from the push-button switches 101, 102 etc.) through a diode 134 and a resistor 135; that conductor may be by-passed to ground through a small capacitor 136, which may be shunted by a reversely poled diode 137.

In the absence of closure of any of the push-button switches 101, 102 etc. no current will flow through the elements 131, 133, 134 and 135, the capacitor 132 will be discharged, and the transistor 140 will be non-conductive. When one of the push-button switches is closed, however, a current will flow through those elements, that switch, the associated address conductor (e.g. 10') and the coil of the respective address relay (e.g. 11) to ground; by choice of a sufficient value for the resistor 135 that current is kept too low to operate the address relay — but it sufficiently lowers the potential of the base of transistor 140 to render that transistor conductive. It will, however, do so subject to a delay imposed by the capacitor 132, which (acting with resistors 133 and 135) will result in that delay being of the order of several milliseconds.

The collector of the transistor 140 may be connected through a diode 141 and a capacitor 159 to the base of an n-p-n transistor 160, whose emitter may be connected to ground and whose base-emitter path may be shunted by a resistor 160', by a small by-pass capacitor 158 and by a reversely-poled diode 157. Between the junction of 141–159 and ground there may be serially connected a resistor 149 and the collector-emitter path of an n-p-n transistor 150, whose base is connected to the conductor N through a resistor 151. Conductor N being normally positive, the transistor 150 will normally be conductive, and the capacitor 159 will stand discharged through the resistor 149, the collector-emitter path of 150 and the diode 157.

The transistor 160 is employed as the final element in the performance of the function of shifting to operated condition the station relay 161, whose coil (shunted by a protective diode 161*a*) is connected between the conductor P and the collector of that transistor 160. When the transistor 140 becomes conductive (as dealt with in the second preceding paragraph) the capacitor 159 will charge from conductor N through the resistor 138, the emitter-collector path of 140, the diode 141, and the base-emitter path of transistor 160, rendering the latter conductive while that charging goes on; the values of resistor 138 and of capacitor 159 are so chosen as to insure that this current will persist for a sufficient time (for example about 20 milliseconds) to fully insure that the station relay 161 will be reliably shifted to (though not held in) operated condition by the collector current of 160.

The station relay 161 includes (in addition to the contact pairs 164 and 165 mentioned above) a pair of normally open contacts 167 which are closed when that relay is operated. One of these contacts is connected to that extremity of the coil of the relay which is connected to the collector of 160, and the other — in the first station 100 — is connected to ground. Once the relay has been shifted to operated condition the closure of these contacts holds the relay operated until the next subsequent interruption of the positive potential of conductor P.

The series circuit S — above referred to, and itself hereinafter more fully dealt with — serially includes in the first station's relay 161 a pair of normally closed contacts 166 which are opened upon the shifting of that relay. By that opening that series circuit S is broken, thereby invoking the actions (on the potentials of conductors N and M) which were described in the sixth preceding paragraph. That shifting of 161 and breaking of S may be assumed to occur in the general order of 15 milliseconds after the closure of the push-button switch 101 (or 102, etc.). Upon that shifting and breaking the transistors 140 and 150 are rendered non-conductive by the removal of positive potential from the conductor N, and transistor 160 (up to then maintained conductive by the flow of 159-charging current) will also then be rendered non-conductive.

A further p-n-p transistor 180 (its emitter-base path shunted by a resistor 180') is included in the electronic apparatus under present description. Its emitter may be connected to conductor M through a diode 179; its collector may be connected through a diode 147 and a resistor 148 to the junction between diode 141 and capacitor 159 abovementioned; and its base may be connected to the junction between the 160 collector and the coil of the station relay 161 — which junction became effectively grounded through the collector-emitter path of 160 previously to the breaking of S — thru resistor 178. As above described, it is some 20 milliseconds after that breaking that the conductor M becomes invested with a substantial positive potential — and at that time the transistor 180 will become conductive, and will so remain so long as conductors N and M retain their reversed-from-normal potentials and the positive potential of conductor P is not interrupted.

An important effect of the onset and continuance of conductivity of the transistor 180 is through diode 147 and resistor 148 promptly to raise the charge of the capacitor 159 (lefthand plate positive) to, and to maintain it at, a voltage higher than the voltage to which that capacitor is capable of being charged through transistor 140 and diode 141. The transistor 150 having previously become non-conductive as a result of conductor N losing its positive potential, the circuit 149-150 is without effect on that charge — which will be maintained until the conductor-N and -M potentials are restored to normal for an appreciable interval. Beneficial effects of the maintenance of that charge are hereinafter pointed out.

Another effect of the onset and continuance of conductivity of the transistor 180 is to close the contact pairs 182 and 183 already mentioned at an early point in the description of the station 100. This effect is achieved by the connection, between the collector of transistor 180 and ground, of the coil (shunted by a protective diode 181a) of a line-connection relay 181 in which those contact pairs 182 and 183 are comprised.

There is a final function to be performed by the electronic apparatus individual to each station: i.e., to shift to operated condition that address relay to which there is connected the push-button switch 101 (or 102 etc.)

which has been operated. Thus in the station relay 161 there may be provided (in addition to the contact pairs 164, 165, 166 and 167 already mentioned) a normally closed pair of contacts 162 and a normally open pair of contacts 163. Across the normally closed pair 162 there may be connected a capacitor 191 of substantial value and a resistor 192. One contact of the normally open pair 163 may be connected to the conductor M; the other contact of that pair may be connected to ground through the just-mentioned capacitor 191 and a resistor 193 — and from the junction of 191–193 to the lower extremity of resistor 135 there may be connected a diode 194.

Upon the closing of the push-button switch the potential of that lower resistor-135 extremity will drop to a very low value (since it then becomes separated from ground only by the resistance of the coil of the address relay 11) and it will remain at that low value so long as the push-button switch remains closed. The push button switches are desirably of a type which if closed at all can be depended on to remain closed for a minimum interval of 40 to 50 milliseconds. At the expiration of the first very approximate 15 milliseconds of this interval the station relay 161 will have been shifted to operated condition, and the capacitor 191 (through the diode 194) thus connected between conductor M and the lower extremity of resistor 135 — but this connection will be of no effect, in view of the presence of the diode 194, while the conductor M remains at its normal unpositive potential. But when the conductor M becomes positive (typically at very approximately 35 milliseconds after push-button closure) the capacitor 191 will charge from conductor M through the push-button switch, the associated address conductor (e.g. 10') and the coil of the respective address relay — and its charging current will impulsively shift the address relay (e.g. 11) to operated condition, thereby impulsively closing its contacts (e.g. 12) — whereupon that relay will be held in operated condition by current through those contacts from conductor 97, whose potential is next dealt with.

In the righthand portion of the electronic apparatus common to all stations (of which apparatus transistors 55, 60 and 65 and their immediately associated components have already been described) there may be provided a p-n-p transistor 95 whose emitter is connected to the conductor M through a normally closed pair of contacts 92 hereinafter further dealt with, whose emitter-base path is shunted by a resistor 95', and whose collector is connected to ground through a resistor 98. Between the base of this transistor 95 and the conductor 97 there may be connected a diode 96. When conductor M becomes positive and the contacts of any one of the address relays are impulsively closed (as dealt with in the preceding paragraph), current will flow through the emitter-base path of 95, through 96 and 97, through the address-relay contacts and through the address-relay coil — and this current, until interrupted at the contacts 92, will hold the address relay operated.

This current will of course also render conductive the emitter-collector path of 95. Between that collector and the stepping-switch start terminal 41 there may be connected a capacitor 99, which will normally be discharged through resistor 98 and internal elements within the stepping switch. The onset of conductivity of transistor 95, occurring when conductor M is rendered positive as above described, will cause the charging of this capacitor 99, whose charging current provides the positive impulse required to start the operation of the stepping switch — and thus to start the operation of the apparatus first above described.

At the conclusion of the dialing operation effected by that first-described apparatus the stepping switch 40 will go out of operation and its terminal 42 (which was at negligible potential during that operation) will resume its normal positive potential. This resumption (in addition to clamping the pulse generator 45 out of operation as already mentioned) may be relied on to restore not only the operated address relay, but also the various components of the station which has been in use and the electronic apparatus common to all stations, all to normal condition. This is done through further circuitry comprised in that common apparatus.

Therein, from a terminal 89 typically of medium positive potential to ground, there may be connected a voltage-divider comprising upper and lower resistors 79 and 80 respectively. A cascaded pair of n-p-n transistors 85 and 90 may be provided, the emitter of 85 being connected to the base of 90, a resistor 87 and small by-pass capacitor 88 being disposed (in parallel with each other) between that connection and ground, the collector of 85 being connected to terminal 89 through a resistor 86, and the emitter of 90 being connected to ground. From the terminal 89 to the base of 85 there may be connected serially a resistor 83, a capacitor 84 and a diode 85a; the 83–84 junction may be clamped down to the 79–80 junction by a diode 81, and a reversely-poled diode may be shunted from the **84–85*a* junction to ground. Normally the upper plate of capacitor 84 will be substantially at the potential of the 79–80 junction, and its lower plate will be substantially at ground potential — i.e. the capacitor 84 will be charged to essentially the voltage appearing across resistor 80. When the stepping switch 40 is in operation (i.e. during dialing) and its terminal 42 therefore at negligible potential, capacitor 84 will stand discharged through elements within the stepping switch and through diode 82. When the stepping switch goes out of operation (i.e. upon the completion of dialing) the attendant resumption by terminal 42 of its normal positive potential will result in the recharging of capacitor 84 through the diode 85*a* and the base-emitter path of 85 — this recharging rendering transistors 85 and 90** briefly conductive.

Between the positive terminal 94 and the collector of 90 there may be connected the coil (shunted by a protective diode **91*a*) of a relay 91, whose contacts include the normally closed contacts 92 mentioned in the fourth preceding paragraph. The brief conductivity of transistors 85 and 90 upon the completion of dialing, just described, will cause a brief interruption of the closed condition of the contacts 92, thereby interrupting the flow of current through the coil of the operated address relay (e.g. 11**) and thereby causing that relay to resume its normal condition.

The restoration of the station components and of the common electronic apparatus to their normal conditions is accomplished by another pair 93 of normally closed contacts included in the relay 91 which contacts, being briefly opened coincidentally with the brief opening of the contacts 92, then briefly interrupt the connection of the conductor P to the positive terminal 94. This interruption will cause a brief interruption of the closed condition of the contacts 167 (assuming station 100 to have been the station in use), thereby interrupting the flow of current through the coil of the station relay 161 and causing that relay to resume its normal condition; that resumption will terminate the flow of current through the emitter-base path of transistor 180 and thus will terminate the conductivity of that transistor and the flow of current through the coil of relay 181, thereby causing that relay also to resume its normal condition.

In turn, the resumption by the station relay of its normal condition results in the reclosure of the circuit S at the contacts 166, the regrounding of point Z, the termination of conductivity of the transistor 60, and the termination of conductivity by the transistor 65 — as a result of which the conductors N and M are restored to their normal potentials first outlined in the description pertinent to those conductors.

In the common electronic circuitry one portion (including the transistors 70 and 75) remains to be described. The occasion for its presence is the possibility that a station relay will have become shifted to and held in operated condition without the dial-signal generating means — i.e. the FIG.-2 oscillator and the stepping switch 40 and the pulse generator 45 — operating to conclusion (or operating at all). For example, if a push-button switch (e.g. 101) has somehow been so manipulated as to have stayed closed for only some 20 or 25 milliseconds, then the station relay (e.g. 161) will have been shifted to and will be being maintained in operated condition, the series circuit S will have been broken and the delayed change of conductor-M potential will have been invoked, but the push-button switch will have opened before the occurrence of that potential change and thus before the address relay (e.g. 11) has been shifted — under which circumstance, if not suitably counteracted, the system would "hang up" in an inoperable condition. A suitable counteractive for any such hang-up is the brief opening of the contacts 93 at the end of a predetermined interval after the shift of the station relay to operated condition — an interval chosen, of course, to be substantially longer than the maximum duration of a dialing operation.

Thus from conductor N to ground there may be serially connected the base-emitter path (shunted by a resistor 70') of an n-p-n transistor 70, which will accordingly be conductive so long as N remains positive but will cease to be conductive when N loses its positive potential at the time of shifting of any station relay to operated condition. Between the medium-potential terminal 89 and ground there may be serially connected the base-II-to-base-I path of a unijunction transistor 75 and a resistor 74, and between the same terminal 89 and ground there may be serially connected resistors 71 and 72 and a time-delay capacitor 73 — the 72–73 junction being connected to the emitter of 75. The 71–72 junction may be connected to the collector of transistor 70, so that while conductor N remains positive the capacitor 73 will stand discharged; when N loses its positive potential, however, the capacitor 73 will begin to charge, and after the interval required for it to charge to a sufficient voltage the emitter-to-base-I path of 75 will break down, discharging capacitor 73 through that path and through resistor 74 together with whatever elements may be placed in parallel with that resistor. The length of that interval will be predetermined so that it constitutes the interval referred to at the end of the preceding paragraph. Base I of the transistor 75 may be connected through a diode **75*a* and resistors 76 and 78 to the base of transistor 85 abovementioned (the 76–78 junction being by-passed to ground through a small capacitor 77), so that 75*a*, 76, 78 and the base-emitter path of 85 lie in parallel with resistor 74. Accordingly the abovementioned discharge of capacitor 73 will occur partially through that base-emitter path, rendering the transistors 85 and 90** briefly conductive; thereupon there will occur the same restorative actions as described in the second, third and fourth preceding paragraphs.

There have now been described all the components of the station 100, all the components of the electronic apparatus common to all stations, and the operations of all of the foregoing. As noted above, there may be any number of stations, and in FIG. 1 one other station has been fully illustrated and arbitrarily designated as 900 — each of its components being furnished with a designation higher by 800 than the designation of the corresponding component in station 100. The connections of all stations to the address conductors (e.g. 10', 20', 30') and to all the power-supplying conductors (ground, P, N and M) may be identical, in effect paralleling the stations; their connections to the series circuit S, however, are serial — i.e., S, proceeding from ground to point Z, passes serially through the contacts 166 of station 100, would pass serially through the corresponding contacts of any stations which may intervene between 100 and 900, passes serially through the contacts 966 of station 900, and then would pass serially through the corresponding contacts of any stations present beyond 900.

This completes the description of the entire apparatus — the operations of the various portions of which, both within their respective selves and in relation to each other, have also been described. It is, however, desirable to present some further description, especially from a more overall operational standpoint.

Let it be assumed that the apparatus is in standby condition — in which all relays are in their unoperated conditions, station transistors 140, 160 and 180 (and their other-station counterparts) are non-conductive but station transistor 150 (and its other-station counterparts) is conductive, common transistors 55 and 70 are conductive but common transistors 60, 65, 85 and 90 and the emitter-to-base-I path of unijunction transistor 75 are non-conductive, and the stepping switch and pulse generator and oscillator are out of operation — and that the user of station 900 wishes to call the telephone address "344." Having picked up his handset (which forms part of his station proper 910) he will await dial tone in the usual manner and will then simply depress his push button which closes the switch 901; this button depression and switch closure need be only momentary (i.e. through a very brief but finite time such as 40 to 50 milliseconds).

In a few milliseconds from the initiation of switch-901 closure the station transistors 940 and 960 will become conductive, and by very approximately 15 milliseconds from that initiation the station relay 961 will have been shifted to operated condition. Almost forthwith the common transistor 55 will become non-conductive thereby removing positive potential from the conductor N, and the station transistors 940 and 950 will become non-conductive. In another very approximately 20 milliseconds the common transistors 60 and 65 will become conductive, supplying conductor M with positive potential and thereby (a) shifting the address relay 11 to operated condition and rendering the common transistor 95 conductive, (b) rendering the station transistor 980 conductive and shifting the line-connection relay 981 to operated condition thereby connecting with the user's telephone line 914–915 the FIG.-2 oscillator, and (c) through capacitor 99 starting the stepping switch 40 which in turn starts the pulse generator.

Then forthwith the FIG.-2 oscillator, under the control of the stepping switch 40, will generate the successive dual frequency tones which serve to dial the telephone address "344" and which are transmitted out onto the telephone line 914-915 for their intended purpose. At about 50 milliseconds after the transmission of the tone for the final integer "4" of the address the stepping switch 40 will go out of operation, taking with it the pulse generator 45. Then common transistors 85 and 90 will be rendered briefly conductive, restoring station 900 and the common circuitry 55 through 99 back to standby condition — and restoring the station proper 910 to its normal connection to the telephone line 914–915 for the purpose of the dialed call.

Let it now be assumed that the user of station 900 again wishes to call the telephone address "344," picks up his handset, perceives dial tone, and depresses the push button for switch 901 — but that at the instant of switch 901 closure the apparatus is in fact engaged in the process of dialing some address for another of the stations in response to a push-button switch of that other station having been closed at least about 15 milliseconds previously. In response to that other-station switch closure the station relay of that other station will have been shifted to operated condition, and there will have been deprived of positive potential the conductor N — which may be viewed as a means effective while the station relay of any of the stations remains operated for incapacitating the relay-shifting means of all stations — and so the station relay 961 of station 900 cannot then shift.

The station-900 user will not be immediately warned that the system of the preemption of the system, either by hearing the dialing signals elicited by the other station or otherwise. All he need do, however, is to keep his switch 901 closed; as soon as the system has been restored to standby condition at the conclusion of the other-station dialing the conductor N will be restored to its normal positive potential, and the still-closed condition of switch 901 will then result in the same action of the system as though it had been first closed just at the very instant after that restoration. The station-900 user upon hearing dialing signals will know that they are the ones resulting from his switch-901 closure, and that he is accordingly free to release that switch.

The action just described of course encourages each user of the system upon closing any of the push-button switches at his respective station to maintain it closed until he hears the onset of dialing signals (which will be those resulting from his switch closure). Accordingly it will sometimes happen that, while the system is in use as a result of a push-button switch closure at a first station and a resulting operated condition of that station's station relay, push-button switches respectively at two or more other stations will be closed and that they will both or all stand closed when the system is restored to standby condition at the conclusion of the first-station dialing. Such circumstance sets up, between those two or more other stations, a "race" which must be unequivocally "arbitrated".

Speaking more generally, such a race and need for arbitration is set up under any circumstances (including near-simultaneous operation of push-button switches respectively at two or more stations while the system is simply in standby condition) which result in the station relays of those stations being sufficiently energized so that by the time one of them has been shifted to operated condition another or others of those stations will complete their similar shifts. To arbitrate the race it is sufficient to incapacitate the relay-holding means of all but one, so that any shift completion by the others will be a merely transient occurrence. This may be done by means, interconnecting the several stations in a predetermined order of priority and effective while the station relay of any one of them (other of course than the lowest-priority station) remains operated, for incapacitating the relay-holding means of all stations lower in the order of priority than that one. The series circuit S, through which the relay-holding means of each station is energized from one (the grounded) extremity of that circuit, together with the contacts in each station which break it while the station relay of that station remains operated constitutes such a means; the order of priority is of course 100, . . . 900, . . . . Thus if the station relays of stations 100 and 900 are in a race in which both have become sufficiently energized to become shifted to operated condition, the relay-holding means of station 100 will be uninterfered with — but the opening of the station-100 contacts 166 will incapacitate the relay-holding means of station 900; if still another station between those two or beyond 900 were involved in the same race, station 100 would still win.

While the priority thus afforded is desirable for the arbitration of an actual inter-station race, it is usually undesirable that its effect extend to give the higher-priority-station user precedence over the previously placed demands of other-station users who during a previous dialing operation commanded by him have closed push-button switches at their respective stations. It is for this purpose that as an incident to the connection of the dialing signal generator to the telephone line of any station by that station's transistor 180 (or corresponding transistor) that station's capacitor 159 is somewhat overcharged and so held until after the conductor-N and -M potentials are restored to normal for an appreciable (typically several tens-of-milliseconds) interval. That charge, during the minute (typically few-millisecond) rise of potential of conductor N occurring between immediately successive dialings, will be insufficiently reduced to permit any recharging of that capacitor through the transistor 140 and diode 141; thus the elements under discussion incapacitate the station's relay-shifting means until after the system has been restored to standby condition for an appreciable interval.

In the illustrated embodiment of my invention each address relay (e.g. 11), taken with the associated components of its address circuit (e.g. 10) may be considered as a programming device, common to all stations, by the supply of activating current to which the dial-signal generating means is programmed for a respective telephone address. At each station the push-button switches (e.g. 101, 102, 103) may be considered as selection controls each operable to select a respective one of those programming devices. Each station relay (e.g. 16) may be considered as a means normally effective (i.e. by its shifting to operated condition) to mark that station in response to a selection-control operation at that station. The series circuit S and the contacts 166 . . . 966 which break it while any one station relay remains operated function to preclude a more-than-transient coexistent marking of any plurality of the stations. For each station the respective capacitor (e.g. 191) and the diode and conductor in series therewith (e.g. 134 and 105) function to supply activating current from that station to the programming device selected at that station, only after that station has remained marked for a brief but more-than-transient period.

It will be understood that the form of address circuit illustrated and described herein as 10 (together with its associated vertical busses 17, 18 and 19 and their connections to the horizontal busses 1 through 9 and 0) is purely by way of example, and that there may be used any of a wide variety of address circuits — i.e., circuits which when activated will influence the dial-signal generating means to yield a dial signal appropriate to the dialing of the telephone address for which those circuits have been programmed.

While I have disclosed my invention in terms of a particular embodiment thereof, it will be understood that I thereby intend no unnecessary limitations. Thus while I have shown the dial-signal generating means as being of a preferred dual-frequency tone-dialing type, the invention is by no means in all aspects limited thereto. While I have shown the number of digits (and the number of digit conductors emanating from the stepping switch) as three, any other number may, and a greater number usually will, be used; while I have shown the number of address circuits as three, any number from one up may be employed. None of the stations need by physically located near to the others or to the dial-signal generating means. Modifications in various other respects as well will be suggested by my disclosure to those skilled in the art, and such modifications will not necessarily constitute departures from the spirit of the invention or from its scope, which I undertake to define in the following claims.

I claim:

1. In a multi-station telephone dialing system which includes dial-signal generating means and a plurality of common programming devices by the supply of activating current to any of which the generating means is programmed for a respective telephone address: (A) a plurality of stations each having (i) a respective telephone line, (ii) a plurality of selection controls each connected with and operable to select a respective one of said programming devices, and (iii) means normally effective to mark that station in response to a selection-control operation thereat; (B) means connected with said stations for precluding a more-than-transient coexistent marking of any plurality thereof; and (C) a plurality of means, each associated with a respective station and responsive to a selection-control operation thereat, each for supplying activating current from the respective station to the programming device selected thereat only after that station has remained marked for a brief but more-than-transient period.

2. The subject matter claimed in claim 1 further including means effective upon the supply of activating current to the selected programming device to place said generating means in operation on the telephone line of the marked station.

3. The subject matter claimed in claim 2 further including means, rendered effective upon the conclusion of said operation of said generating means, for de-marking the marked station.

4. The subject matter claimed in claim 2 further including means, responsive to the marking of any of said stations and effective upon the ensuing passage of a time appreciably longer than that required for the dialing of any of said telephone addresses without said generating means having operated to conclusion, for de-marking the marked station.

5. The subject matter claimed in claim 2 further including for each station a respective means rendered effective as an incident to the placing of said generating means in operation on the telephone line of that station for precluding a re-marking of that station until the expiration of an appreciable interval after the conclusion of such operation.

6. The subject matter claimed in claim 1 wherein said marking means of each station comprises a respective station relay and a holding means therefor, and wherein said means for precluding a more-than-transient coexistent marking of any plurality of said stations includes circuit means connected with the several said holding means.

7. The subject matter claimed in claim 6 wherein said circuit means comprises a series circuit interconnecting said stations in a predetermined order of priority and effective while any one of said stations other than that of lowest priority remains marked for incapacitating the holding means of all of said stations lower in priority than said one station.

8. In a multi-station telephone dialing system including dial-signal generating means: (A) a plurality of stations each having (i) call-initiating control means, (ii) a respective telephone line and (iii) means responsive to operation of said control means for effecting a temporary seizure of said generating means by that station and the placement of said generating means in operation on that line for the dialing of a predetermined telephone address; (B) means precluding the simultaneous seizure of said generating means by any plurality of said stations; and (C) a plurality of means, each associated with a respective station and rendered effective as an incident to any given seizure of said generating means thereby but otherwise independent of that station's control means, for precluding a re-seizure of said generating means by that station until the expiration of an appreciable interval after the termination of said given seizure.

9. The subject matter claimed in claim 8 wherein said means precluding the simultaneous seizure of said generating means by any plurality of said stations includes circuit means interconnecting said stations in a predetermined order of priority.

* * * * *